(12) United States Patent
Lubomirsky et al.

(10) Patent No.: US 8,852,540 B2
(45) Date of Patent: Oct. 7, 2014

(54) APPARATUS AND METHOD FOR REMOVING SULFUR DIOXIDE FROM FLUE GASES

(75) Inventors: Igor Lubomirsky, Petach Tikva (IL); Valery Kaplan, Rehovot (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 0 days.

(21) Appl. No.: 14/128,287

(22) PCT Filed: Jun. 21, 2012

(86) PCT No.: PCT/IL2012/050217
§ 371 (c)(1),
(2), (4) Date: Dec. 20, 2013

(87) PCT Pub. No.: WO2012/176208
PCT Pub. Date: Dec. 27, 2012

(65) Prior Publication Data
US 2014/0154158 A1    Jun. 5, 2014

Related U.S. Application Data

(60) Provisional application No. 61/499,734, filed on Jun. 22, 2011.

(51) Int. Cl.
*B01D 53/50*    (2006.01)
*B01D 53/74*    (2006.01)
*B01D 53/14*    (2006.01)

(52) U.S. Cl.
CPC ............ *B01D 53/507* (2013.01); *B01D 53/504* (2013.01); *B01D 53/1425* (2013.01); *B01D 53/502* (2013.01); *B01D 2258/0283* (2013.01)
USPC ................ 423/210.5; 423/242.1; 423/244.08; 422/168; 422/173

(58) Field of Classification Search
USPC ........ 423/210.5, 242.2, 244.08; 422/168, 173
See application file for complete search history.

(56) References Cited

U.S. PATENT DOCUMENTS

| | | | |
|---|---|---|---|
| 3,438,727 A | | 4/1969 | Heredy |
| 3,438,728 A | | 4/1969 | Grantham |
| 3,531,386 A | | 9/1970 | Heredy |
| 3,574,543 A | | 4/1971 | Heredy |
| 3,647,358 A | | 3/1972 | Greenberg |
| 3,919,390 A | | 11/1975 | Moore |
| 4,100,107 A | * | 7/1978 | Wolk et al. ..................... 502/411 |
| 4,396,594 A | * | 8/1983 | Kohl .............................. 423/569 |
| 8,628,741 B2 | * | 1/2014 | Presswood et al. ........... 423/210 |

OTHER PUBLICATIONS

Robert A. McIlroy et al., "Absorption of Sulfur Dioxide by Molten Carbonates", Environmental Science & Technology, pp. 1-7, vol. 7, No. 11, (1973).

* cited by examiner

*Primary Examiner* — Timothy Vanoy
(74) *Attorney, Agent, or Firm* — Browdy and Neimark, PLLC

(57) ABSTRACT

An apparatus and method for removing sulfur dioxide from a flue gas is described. The apparatus has sequentially operable scrubbing zone and regeneration zone, which communicate with one another via a molten eutectic mixture of lithium, sodium and potassium carbonates. In the scrubbing zone, an ingress flue gas interacts with the molten carbonates, resulting in chemical absorbance of the sulfur dioxide and in discharge of reaction gases. In the regeneration zone, ether a chemical or electrochemical melt regeneration takes place resulting in formation of sulfur-containing vapor which is cooled down for converting the sulfur-containing vapor into a liquid and solid phase for a further collection and utilization.

21 Claims, 6 Drawing Sheets

APPARATUS AND METHOD FOR REMOVING SULFUR DIOXIDE FROM FLUE GASES

FIELD OF THE INVENTION

The present invention relates generally to scrubber systems and methods used to remove gases from industrial exhaust streams, and in particular, to an apparatus and method for removing sulfur dioxide from flue gases.

BACKGROUND OF THE INVENTION

Sulfur is one of the most widely distributed chemical elements. It occurs as a sulfide or as a sulfate in ores of metals. It is also combined with organic and inorganic elements in fossil fuels. Hence, in the extraction of metals from ores or in the combustion of fuels sulfur dioxide is often one of the products of the process and appears in the waste gases normally vented to the atmosphere. Accordingly, the pollution of the atmosphere by sulfur dioxide is one of the greatest air pollution problems facing mankind today. As oil resources dwindle and a chain of nuclear plant disasters casts doubt on their safety, burning of sulfur-containing fuel (coal, natural gas and peat) is expected to increase.

Removal of gaseous $SO_2$ in coal-burning power plants is routinely performed by reacting the waste gas (flue gas) with limestone (principally $CaCO_3$) or hydrated lime, mainly $Ca(OH)_2$, dispersed in water or utilized in solid form. These techniques are moderately efficient since about 0.05% $SO_2$ still remains in the gas. Moreover, such reactions require a large consumption of reagents in parallel absorption of $CO_2$ and are rather expensive. Furthermore, as an additional product, huge amount of solid waste (usually $CaSO_4$) is produced, which is not utilized.

Methods for the removing sulfur dioxide from a flue gas by absorption in a molten salt mixture containing alkali metal carbonate-containing solution are described in U.S. Pat. Nos. 3,438,727 and 3,438,728. These methods include the following general steps: (1) absorption of the sulfur dioxide in a molten salt mixture containing alkali metal carbonate to form alkali metal sulfite, (2) reduction of the alkali 5 metal sulfite by treatment with hydrogen, carbon monoxide, or a mixture thereof to form alkali metal sulfide, and (3) treatment of the alkali metal sulfide with a gaseous mixture containing steam and carbon dioxide to form hydrogen sulfide and regenerate the alkali metal carbonate absorbent. In operation, the molten carbonate salt is sprayed into desulfurized 10 flue gas which flows into a demister that serves to remove entrained salt-containing droplets from the flue gas which is then passed in an absorber tower and then through a plurality of heat exchangers from which it is discharged to the atmosphere.

The molten sulfite-containing carbonate resulting from the reaction between the molten carbonate spray and the flue gas is collected in a dished-bottom heated sump of absorber. The sulfite-carbonate mixture is then pumped from sump of absorber to a heat exchanger. The mixture leaves heat exchanger by way of a conduit and passes through a heater, which is optionally utilized for further increasing the temperature of the mixture. The mixture leaves heater through a conduit where it is fed into a spray distributor in a reducer unit.

GENERAL DESCRIPTION

It is known that a desulfurization method based on molten eutectic mixture of lithium (Li), sodium (Na), and potassium (K) carbonates can be used to scrub a flue gas. In particular, it was shown that by using a spray of molten Na, K and Li carbonate eutectic, large quantities of a flue gas can be almost completely scrubbed of $SO_2$ (i.e., down to 0.001%) with a relatively small amount of melt (see, for example, R. A. McIlroy, et al., Environmental Science & Technology, 7(11), 1022 (1973)).

A Na—K—Li carbonate eutectic has a solidification point of 391° C. Between the solidification point and 500° C., the reaction between $SO_2$ (and HCl) and the carbonate melts is rapid and shifted almost completely to $SO_3^{2-}$:

$$SO_2(gas)+CO_3^{2-}(melt)\rightarrow CO_2(gas)+SO_3^{2-}(melt) \quad (1a)$$

Some of the $SO_2$ oxidizes to $SO_3$ and then reacts with the melt:

$$SO_3(gas)+CO_3^{2-}(melt)\rightarrow CO_2(gas)+SO_4^{2-}(melt). \quad (1b)$$

Most of the sulfite in the melt eventually oxidizes to sulfate:

$$SO_3^{2-}(melt) + \frac{1}{2}O_2(gas) \rightarrow SO_4^{2-}(melt). \quad (1c)$$

As a result, the carbonate melt becomes a mixture of carbonates, sulfates and sulfites.

Melt regeneration process removing sulfates from the melt, necessary for continuous operation, can include two steps:

(a) reduction to sulfide $S^{2-}$ by coal dust at 850° C.:

$$\text{disproportionation: } SO_3^{2-}(melt)\rightarrow SO_4^{2-}(melt)+S^{2-}(melt); \quad (2a)$$

$$\text{reduction by coal dust to sulfide: } SO_3^{2-}(melt)+3C\rightarrow 3CO_2(gas)+2S^{2-}(melt)$$

$$SO_3^{2-}(melt)+2C\rightarrow 2CO_2(gas)+S^{2-}(melt) \quad (2b)$$

and (b) sulfide removal as $H_2S$ by $H_2O+CO_2$ (in practice, flue gas with steam) at 450° C.:

$$S^{2-}(melt)+2CO_2(gas)+H_2O\rightarrow CO_3^{2-}(melt)+H_2S(gas). \quad (3)$$

Unreacted $S^{2-}$ (melt) can oxidize by the oxygen in the flue gas during scrubbing.

It should be noted that this regeneration process has two serious deficiencies. First, at 850° C. (which is required for the reduction process), carbonate melts become very aggressive. Cr-rich stainless steel and most other alloys commonly used in containers to keep carbonates below 500° C. undergo rapid corrosion above 600° C. Accordingly, the corrosion rate of the container limits the scrubbing temperature to be below 500° C.

Another deficiency is associated with impurities presented in the coal dust, which accumulate in the melt making it too viscous. Indeed, coal dust may contain at least 10% of impurities (i.e., fly ashes with particle size less than 30 micrometers) that are mostly alumina and silica. Therefore, long term stability of the process requires chemically pure carbon dust, which is rather expensive and impractical.

Despite known techniques in the area of removing sulfur dioxide from flue gases, there is still a need in the art for further improvement in order to decrease $SO_2$ content below 0.01% and not to consume expensive materials, which can result in increased cost-saving, when compared to the known techniques.

Moreover, it would be useful to have a novel apparatus and method for removing sulfur dioxide from flue gases which do not generate non-utilized waste.

Likewise, it would be advantageous to have a novel apparatus and method for removing sulfur dioxide from flue gases which will be highly selective to $SO_2$ with respect to $CO_2$.

The present invention partially eliminates disadvantages of the known techniques and provides a novel apparatus and method for removing sulfur dioxide from a flue gas. The apparatus has sequentially operable scrubbing zone and regeneration zone, which communicate with one another via a molten eutectic mixture of lithium, sodium and potassium carbonates.

In the scrubbing zone, an ingress flow of a flue gas interacts with the molten carbonates, resulting in chemical absorbance of the sulfur dioxide and in discharge of a scrubbed gas. In the regeneration zone, a chemical regeneration or an electrochemical regeneration of the molten mixture of carbonates, sulfites and sulfates takes place, resulting in formation of sulfur-containing vapor which is cooled down for converting the sulfur-containing vapor into a liquid and solid phase for a further collection and utilization.

According to some embodiments of the present invention, the method for removing sulfur dioxide from a flue gas comprises providing a controllable ingress flow of the flue gas into a scrubbing zone. The scrubbing zone contains a molten eutectic mixture of lithium, sodium and potassium carbonates at a first predetermined temperature. For example, the first predetermined temperature can be in the range of about 400° C. to 500° C.

As a result, the flue gas is scrubbed by absorbing the sulfur dioxide, and forming a molten mixture of carbonates, sulfites and sulfates along with a scrubbed gas. The method also includes discharging an egress flow of a scrubbed gas from the scrubbing zone. When desired, a turbulent flow of said flue gas can be provided within the scrubbing zone.

The method also includes heating the molten mixture of carbonates, sulfites and sulfates to a second predetermined temperature in a regeneration zone, which is in hydraulic communication with the scrubbing zone. For example, the second predetermined temperature can be in the range of about 400° C. to 1000° C.

After the heating, either a chemical regeneration or an electrochemical regeneration of the molten mixture of the carbonates, sulfites and sulfates is provided in the regeneration zone to produce a sulfur-containing vapor. After releasing the sulfur-containing vapor from said regeneration zone, the sulfur-containing vapor is cooled down for its conversion into liquid and solid phase materials, which are collected and stored for a further utilization.

According to some embodiments, the chemical melt regeneration comprises the step of treating the molten mixture of carbonates, sulfites and sulfates with a reductant gas by passing said gaseous mixture through said molten mixture. For example, the reductant gas is a gaseous mixture comprising carbon monoxide.

According to some embodiments, the electrochemical melt regeneration comprises contacting an anode electrode and a cathode electrode with the molten mixture of carbonates, sulfites and sulfates within a regeneration zone; and creating a predetermined electric field between the anode electrode and the cathode electrode (e.g. by applying a predetermined electric voltage across the anode electrode and the cathode electrode, or potential difference between the electrodes) to provide an electric current of predetermined current density between the electrodes. For example, the predetermined potential difference can be in the range of about 0.5V to 20V. For example, the predetermined electric current density can be in the range of about 0.005 $A/cm^2$ to 5 $A/cm^2$.

According to some embodiments of the present invention, the apparatus includes a housing defining (by the housing walls) a scrubbing chamber and a regeneration chamber separated from the scrubbing chamber by a separating wall. The separating wall has an open region to provide a hydraulic communication between the scrubbing chamber through a pool common for the scrubbing chamber and the regeneration chamber and comprising a molten eutectic mixture of lithium, sodium and potassium carbonates.

The scrubbing chamber comprises a flue gas inlet port configured for receiving an ingress flow of said flue gas, and a scrubbed gas outlet port configured for discharging an egress flow of a scrubbed gas from the scrubbing chamber. The scrubbing chamber is configured for scrubbing the flue gas by absorbing the sulfur dioxide in the pool to form a molten mixture of carbonates, sulfites and sulfates in the pool. The regeneration chamber is configured for producing a sulfur-containing vapor; and comprises a sulfur-containing vapor outlet port configured for controllable release of the sulfur-containing vapor obtained therein.

According to some embodiments of the present invention, the apparatus also includes a sulfur-containing material collector coupled to the sulfur-containing vapor outlet port via a cooling manifold configured for cooling down said sulfur-containing vapor, and thereby converting said sulfur-containing vapor into a liquid and solid phase materials.

According to some embodiments, the scrubbing chamber of the apparatus of the present invention comprises a scrubbing chamber heater configured for melting the eutectic mixture of lithium, sodium and potassium carbonates, and thereby providing the molten mixture and maintaining the molten mixture at a first predetermined temperature. When desired, the scrubbing chamber can include a first temperature sensor arranged within the scrubbing zone and configured for measuring the first predetermined temperature for controlling operation of the scrubbing chamber heater.

According to some embodiments, the regeneration chamber comprises a regeneration chamber heater configured to heat and maintain the molten mixture of carbonates, sulfites and sulfates at a second predetermined temperature. When desired, the scrubbing chamber can include a second temperature sensor arranged within the regeneration zone and configured for measuring the second predetermined temperature for controlling operation of the regeneration chamber heater.

According to some embodiments, scrubbing chamber includes a plurality of baffles arranged within the scrubbing chamber and configured to provide a turbulent flow of said flue gas within the scrubbing zone.

In some embodiments, a first baffle of the plurality of baffles extends downward from a top scrubbing chamber wall to a length in the range of 30% to 50% of a total height of the scrubbing chamber such that a distance between a bottom end of the first baffle and a level of said molten mixture of carbonates, sulfites and sulfates is in the range of about 5% to 30% of the height of the scrubbing chamber.

A flue gas inlet port may be arranged in a vertical scrubbing chamber wall. A distance between an inner lateral surface of the scrubbing chamber wall and the first baffle can, for example, be in the range of about 5% to 25% of a length of the scrubbing chamber.

According to some embodiments, a second baffle of the plurality of baffles is arranged parallel to and downstream of the first baffle with respect to the ingress flow such that a bottom end of the second baffle is immersed in said molten mixture, whereas the top end of the second baffle is arranged at a distance from an inner top surface of the scrubbing chamber wall, which is in the range of about 5% to 30% of the total height of the scrubbing chamber.

A length of the second baffle may be in the range of 30% to 50% of the height of the scrubbing chamber.

A distance between the bottom end of the second baffle and an inner bottom surface of the scrubbing chamber wall may be in the range of about 80% to 99% of the pool depth of the molten mixture.

A distance between the first and second baffles may be in the range of about 5% to 20% of the length of the scrubbing chamber.

In some embodiments, the separating wall, that provides a hydraulic communication between the scrubbing chamber and the regeneration chamber, extends downward from a top housing wall such that a distance between a bottom end of the separating wall and an inner bottom surface of the housing wall is in the range of 30% to 50% of the pool depth of the molten mixture of carbonates, sulfites and sulfates.

A length of the scrubbing chamber may be in the range of 70% to 80% of the total length of said housing.

According to some embodiments, the apparatus for removing sulfur dioxide from a flue gas comprises inlet manifold coupled to the flue gas inlet port and configured for providing the ingress flow of the flue gas; and a controllable inlet valve arranged along the inlet manifold and configured for regulating an ingress flow rate of said flue gas.

According to some embodiments, the apparatus for removing sulfur dioxide from a flue gas comprises an outlet manifold coupled to the scrubbed gas outlet port and configured for discharging the egress flow of the scrubbed gas; and a controllable outlet valve arranged along the inlet manifold and configured to regulate an egress flow rate of said scrubbed gas.

According to some embodiments, the scrubbing chamber further includes a nozzle coupled to the flue gas inlet port inside the scrubbing chamber. The nozzle is configured to regulate direction of the ingress flow of the flue gas into the scrubbing chamber.

According to some embodiments, the regeneration chamber comprises an anode electrode and a cathode electrode being in contact with the molten mixture of carbonates, sulfites and sulfates to form a regeneration zone configured to provide electrochemical regeneration of the molten mixture and to produce a sulfur-containing vapor.

The inner surface of the housing walls may be made of an alloy containing at least one element selected from titanium, aluminium, zirconium, tantalum and niobium.

The inner surface of the housing walls of the regeneration chamber may be made of titanium.

The cathode electrode may, for example, be a titanium electrode.

The cathode electrode may, for example, be made of an alloy containing at least one element selected from titanium, aluminium, zirconium, tantalum and niobium.

The anode electrode may, for example, be any one electrode selected from a titanium electrode, a carbon-clad titanium electrode, and a graphite electrode.

The anode electrode may, for example, be arranged at a bottom of the regeneration chamber.

According to some embodiments, the cathode electrode is a potential electrode immersed into said molten mixture of carbonates, sulfites and sulfates, whereas said anode electrode is coupled to or associated with a grounded conductive surface of a bottom of the regeneration chamber.

According to some embodiments, the regeneration chamber comprises a reducing gas inlet port configured for receiving reductant gas and directing it into the pool to form a regeneration zone configured to provide chemical regeneration of the molten mixture and to produce the sulfur-containing vapor. The reductant gas can, for example, be a gaseous mixture comprising carbon monoxide.

According to some embodiments, the scrubbing chamber further includes a molten mixture outlet port arranged at a bottom of the scrubbing chamber within the pool, a molten mixture inlet port arranged at a top of the scrubbing chamber, and a sprinkler coupled to the molten mixture inlet port from an inner side of a top scrubbing chamber wall of the scrubbing chamber. The molten mixture outlet port is coupled to the molten mixture inlet port via a molten mixture manifold to provide circulation of the molten mixture from the pool at the bottom of the scrubbing chamber to the top of the scrubbing chamber for spraying within the scrubbing chamber through the sprinkler.

According to some embodiments, the regeneration chamber includes another molten mixture outlet port arranged at a bottom of the regeneration chamber within the pool, a molten mixture inlet port arranged at a top of the scrubbing chamber, and a sprinkler coupled to the molten mixture inlet port from an inner side of a top scrubbing chamber wall of the scrubbing chamber. This another molten mixture outlet port is coupled to the molten mixture inlet port via a molten mixture manifold to provide circulation of the molten mixture from the pool at the bottom of the scrubbing chamber to the top of the scrubbing chamber for spraying within the scrubbing chamber through the sprinkler.

According to some embodiments, the apparatus includes a pump associated with the molten mixture manifold and configured to provide driving force for the circulation of the molten mixture through the molten mixture manifold.

According to some embodiments, the apparatus includes a molten mixture filter arranged within the molten mixture manifold and configured for filtering out moot present in the flue gas and dispersed in the pool of the molten mixture.

The above described configuration of the apparatus according to the present invention provides for low manufacturing cost thereof. The apparatus of the present invention may be easily and efficiently fabricated and marketed, and have durable and reliable construction.

The method of the present invention is highly economical and does not require expensive materials (precious or rare metals, ceramic liners), and could be readily integrated into the existing infrastructure.

The technique of the present invention provides for decreasing sulfur-containing emission from power stations without generation of additional solid or liquid waste.

There has thus been outlined, rather broadly, the more important features of the invention so that the detailed description thereof that follows hereinafter may be better understood, and the present contribution to the art may be better appreciated. Additional details and advantages of the invention will be set forth in the detailed description.

BRIEF DESCRIPTION OF THE DRAWING

In order to understand the invention and to see how it may be carried out in practice, embodiments will now be described, by way of non-limiting example only, with reference to the accompanying drawing, in which.

DETAILED DESCRIPTION OF EMBODIMENTS

Figure 1:
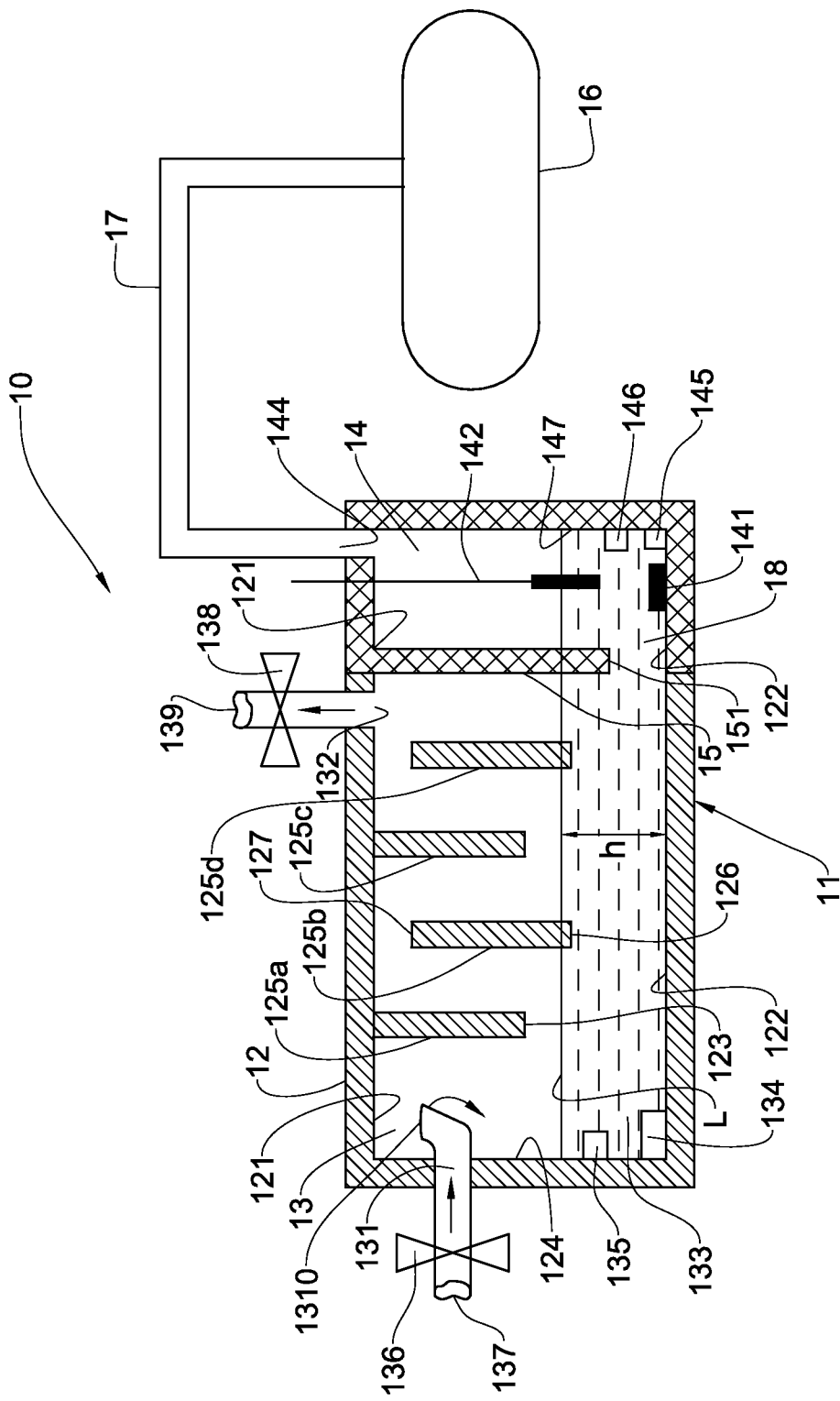
FIGS. 1-6 illustrate schematic fragmentary longitudinal cross-sectional view of an apparatus for gas storage, according to several embodiments of the present invention.

The principles and operation of an apparatus for removing sulfur dioxide ($SO_2$) from a flue gas according to the present invention may be better understood with reference to the drawings and the accompanying description, wherein like reference numerals have been used throughout to designate identical elements. It being understood that these drawings which are not necessarily to scale, are given for Illustrative purposes only and are not intended to limit the scope of the invention. Examples of constructions, materials, dimensions, and manufacturing processes are provided for selected elements. Those versed in the art should appreciate that many of the examples provided have suitable alternatives which may be utilized.

Referring to FIG. 1, there is illustrated a schematic fragmentary longitudinal cross-sectional view of an apparatus 10 for removing sulfur dioxide from a flue gas, according to an embodiment of the present invention. It should be noted that this figure is not to scale, and is not in proportion, for purposes of clarity. It should also be noted that the blocks, as well other elements in this figure, are intended as functional entities only, such that the functional relationships between the entities are shown, rather than any physical connections and/or physical relationships.

According to an embodiment of the present invention, the apparatus 10 for removing sulfur dioxide ($SO_2$) from a flue gas includes a housing 11 having housing walls 12. The housing walls 12 define a scrubbing chamber 13 and a regeneration chamber 14. It should be understood that the housing 11 may have any desired dimension and shape, such as cylindrical, prismatic, etc. Moreover, the dimension of the cavities may have any desired size distribution. For example, when the housing 11 has a shape of a rectangular prism, a length of the scrubbing chamber can be in the range of about 70% to 80% of the total length of the housing 11.

An inner surface of the housing walls 12 may be made of an alloy containing at least one element selected from titanium, aluminium, zirconium, tantalum and niobium.

The scrubbing chamber 13 includes a flue gas inlet port 131 configured for receiving an ingress flow of the flue gas and a scrubbed gas outlet port 132 configured for discharging an egress flow of a scrubbed gas from the scrubbing chamber 13. For example, the flue gas inlet port 131 can be arranged in a vertical scrubbing chamber wall 124. The flue gas inlet port 131 is coupled to an inlet manifold 137 configured for providing the ingress flow of the flue gas. In turn, the scrubbed gas outlet port 132 is coupled to an outlet manifold 139 configured for discharging an egress flow of a scrubbed gas from the scrubbing chamber 13.

According to an embodiment of the present invention, a controllable inlet valve 136 and a controllable outlet valve 138 are arranged along the inlet manifold 137 and the outlet manifold 139, respectively. The inlet valve 136 is configured to regulate the ingress flow rate of the flue gas, whereas the outlet valve 138 is configured to regulate the egress flow rate of the scrubbed gas. The term "valve" as used herein has a broad meaning and relates to any electrical and/or mechanical device adapted to regulate the flow rate of gases.

According to an embodiment of the present invention, the scrubbing chamber 13 includes a nozzle 1310 coupled to the flue gas inlet port 131 inside the scrubbing chamber 13. The nozzle 1310 is configured to regulate direction of the ingress flow of the flue gas into the scrubbing chamber 13. For this purpose, in order to provide desired turbulence of the flow of the flue gas within the scrubbing zone 13, the nozzle 1310 can be controllable bent by a solid angle of 0 to 180 degrees (as shown by an arrow) with respect to the vertical scrubbing chamber wall 124.

For example, the ingress flow of the flue gas may include $SO_2$ at a concentration of about 0.01-5 volume %, $O_2$ at a concentration of about 0.5-5 volume %, $CO_2$ at a concentration of about 0-25 volume %, $H_2O$ at a concentration of about 0-20 volume %, $N_2$ and inevitable impurities as a remainder. In turn, the egress flow of the scrubbed gas differs from the ingress flow in the fact that it does not contain $SO_2$ at all or contains it at a substantially reduced concentration.

According to an embodiment of the present invention, the scrubbing chamber 13 contains a molten eutectic mixture of lithium, sodium and potassium carbonates. The scrubbing chamber 13 forms a scrubbing zone configured for scrubbing the flue gas by absorbing the sulfur dioxide. In operation, after the absorbing of the sulfur dioxide from the ingress flow, a pool 133 with a molten mixture of carbonates, sulfites and sulfates is formed within the scrubbing chamber 13. As shown in FIG. 1, the housing 11 with the walls 12 are common for the both chambers 13 and 14. Accordingly, the pool 133 is also common for the scrubbing chamber 13 and the regeneration chamber 14, thereby providing hydraulic communication therebetween. There are advantages of an apparatus with the common pool over the apparatus in which the scrubbing chamber 13 and the regeneration chamber 14 are two separated chambers communicating via a suitable conduit. In particular, the provision with a common pool allows reducing heat losses, because for same melt quantity the total surface of the apparatus with total molten pool is less than the total surface of the scrubbing chamber 13 and the regeneration chamber 14 connected by a conduit (i.e., a pipe). The provision of the present invention may result in a decrease of consumption of electric power (or fuel) for the chambers to be heated and maintained at the operating temperature. Moreover, the provision with a common pool allows reduction of the risk of melt solidification in the pipes and the difficulty of selection of materials for the pipes. Furthermore there is no need in the device with a common pool in pumps for transferring melts from the scrubbing chamber 13 to the regeneration chamber 14 at high temperatures (i.e., 400° C.-500° C.), which can be a separate technical problem, when the scrubbing chamber 13 and the regeneration chamber 14 are separated.

The scrubbed gas (containing the components of the ingress gas mixture but without $SO_2$) is discharged through the scrubbed gas outlet port 132.

In operation, a flow of the flue gas in the scrubbing chamber 13 within the scrubbing zone is a turbulent flow. In order to provide turbulence within the scrubbing zone, the scrubbing chamber includes a plurality of baffles arranged within the scrubbing chamber. Although only four such baffles (125a, 125b, 125c, and 125d) are shown in FIG. 1, generally, any suitable number of the baffles can be provided to provide desired turbulence of the flow of the flue gas within the scrubbing zone 13.

According to an embodiment of the present invention, a first baffle 125a of the plurality of baffles extends downward from an inner side of a top scrubbing chamber wall 121 to a length in the range of about 30% to about 50% of a total height of the scrubbing chamber 13. In this case a distance between a bottom end 123 of the first baffle 125a and a level L of the pool 133 of the molten mixture of carbonates, sulfites and sulfates is in the range of about 5% to about 30% of the height of the scrubbing chamber. For example, a distance between an inner lateral surface of the scrubbing chamber wall 124 and the first baffle 125a can be in the range of about 5% to about 25% of a length of the scrubbing chamber.

According to an embodiment of the present invention, a second baffle 125b of the plurality of baffles is arranged parallel to and downstream of the first baffle 125a with respect to said ingress flow. A distance between the first baffle 125a and the second 125b baffle can, for example, be in the range of about 5% to 20% of the length of the scrubbing chamber 13.

A length of the second baffle 125b can, for example, be in the range of about 30% to about 50% of the height of the scrubbing chamber 13. A bottom end 126 of the second baffle 125b is immersed in the pool 133 of the molten mixture, whereas a top end 127 of the second baffle 125b is arranged at a predetermined distance from an inner top surface 121 of the scrubbing chamber wall 12. This predetermined distance can, for example, be in the range of about 5% to about 30% of the total height of the scrubbing chamber. A distance between the bottom end 126 of the second baffle 125b and an inner bottom surface 122 of the scrubbing chamber wall 12 is in the range of about 80% to about 99% of the pool depth h of the molten mixture.

The regeneration chamber 14 is separated from the scrubbing chamber 13 by a separating wall 15. The separating wall 15 extends downward from a top housing wall 121 and is immersed in the pool 133 formed by the molten mixture of carbonates, sulfites and sulfates. According to an embodiment, the separating wall 15 has an open region 18 between the scrubbing chamber 13 and the regeneration chamber 14. The length of the open region 18 is equal to the a distance between a bottom end 151 of the separating wall 15 and an inner bottom surface of the housing wall 12, which is in the range of about 30% to about 50% of the depth h of the pool 133 of the molten mixture of carbonates, sulfites and sulfates. Such a provision of the separating wall 15 provides a hydraulic communication of the molten mixture between the scrubbing chamber 13 and the regeneration chamber 14 within the pool 133.

According to an embodiment, the scrubbing chamber 13 includes a scrubbing chamber heater 134 configured to melt eutectic mixture of lithium, sodium and potassium carbonates and thereby to provide the molten mixture thereof; and to maintain the molten mixture at a first predetermined temperature. For example, the first predetermined temperature can be in the range of about 400° C. to about 500° C.

The scrubbing chamber 13 may include a first temperature sensor 135 arranged in the scrubbing zone within the pool 133, and configured for measuring the first predetermined temperature for controlling operation of the scrubbing chamber heater 134.

The regeneration chamber 14 includes an anode electrode 141 and a cathode electrode 142 being in contact with the pool 133 of the molten mixture of carbonates, sulfites and sulfates. The regeneration chamber 14 forms a regeneration zone, in which an electrochemical regeneration of the molten mixture of carbonates, sulfites and sulfates takes place and a sulfur-containing vapor is produced. As shown in FIG. 1, the anode electrode 141 is arranged at a bottom of the regeneration chamber 14, whereas the cathode electrode 142 is arranged vertical position.

However, when desired, the both electrodes 141 and 142 can be arranged in a vertical position and separated along the gas phase by a partition (not shown). This provision can prevent oxidation of the sulfur-containing vapor with oxygen generated on the anode electrode 141.

When desired, a bottom of the regeneration chamber 14 can be electrically conductive, and the anode electrode 141 can be coupled to or associated with a grounded conductive surface of a bottom of the regeneration chamber 14.

The anode electrode 141 can be an electrode selected from a titanium electrode, a carbon-clad titanium electrode, and a graphite electrode.

The cathode electrode 142 can be a titanium electrode; or may be made of an alloy containing at least one element selected from titanium, aluminium, zirconium, tantalum and niobium.

The cathode electrode 142 can, for example, be a potential electrode immersed into the pool 133 of molten mixture of carbonates, sulfites and sulfates within the regeneration zone.

In operation, a predetermined electric voltage is applied across the anode electrode the cathode electrodes 141 and 142 to provide an electric current having predetermined current density therebetween. The voltage applied between the anode and the cathode depends on the configuration of the apparatus. For example, the predetermined electric voltage can be in the range of about 0.5V to 20V, depending on the distance between the electrodes, area of the electrodes and operation temperature. Accordingly, the predetermined electric current density can vary in the range of about 0.005 A/cm$^2$ to 5 A/cm$^2$.

The regeneration chamber 14 can include a regeneration chamber heater 145 configured to heat and maintain the molten mixture of carbonates, sulfites and sulfates at a second predetermined temperature. For example, the second predetermined temperature can be in the range of about 400° C. to about 1000° C. In order to withstand such great temperatures, an inner surface 147 of the housing walls of the regeneration chamber 14 can, for example, be made of titanium.

The regeneration chamber 14 can include a second temperature sensor 146 arranged in the regeneration zone within the pool 133 and configured for measuring the second predetermined temperature for controlling operation of the regeneration chamber heater.

The regeneration chamber 14 also includes one or more sulfur-containing vapor outlet ports 144 (only one outlet port 144 is shown in FIG. 1), and one or more corresponding cooling manifolds 17 (only one cooling manifold 17 is shown in FIG. 1) through which a sulfur-containing vapor resulting from the electrochemical regeneration releases from the regeneration chamber 14. The cooling manifold 17 is configured for cooling down said sulfur-containing vapor, and thereby converting the sulfur-containing vapor into a liquid and solid phase materials. The cooling manifold 17 can be a tube made of a heat conductive material which is open to the atmospheric air and placed at the room temperature. In this case, the cooling of the sulfur-containing vapor can be carried out during the passing of the material through the cooling manifold 17. When desired, the cooling manifold 17 can be arranged within a dedicated cooling device (not shown).

The apparatus 10 for removing sulfur dioxide may include a sulfur-containing material collector 16 coupled to the sulfur-containing vapor outlet port 144 via the cooling manifold 17. Examples of the liquid and solid phase materials include, inter alia, elemental sulfur, and $SO_2$, $SO_3$, $H_2S$. These $SO_2$, $SO_3$, $H_2S$ gas materials can, for example, be used for production of sulfuric acid ($H_2SO_4$).

The sulfur-containing material collector 16 can be any suitable vessel such as a container, tank, chamber, cartridge, housing, frame or any other structure that can be used for collecting and storing the liquid and solid phase materials obtained during the regeneration in accordance with the teaching of the present invention.

The apparatus 10 may include or be connectable to a control system (not shown) that is coupled to the controllable inlet valve 136 and to the controllable outlet valve 138, and configured for controlling operation thereof. Likewise, the control system can be adjusted to control operation of the scrubbing chamber heater 134 and the regeneration chamber heater 145. Specifically, the signals produced by the first temperature sensor 135 and second temperature sensor 146 can be relayed to the control system via a connecting wire (not shown) or wirelessly. In response to these signals, the control system can generate corresponding control signals to control operation of the scrubbing chamber heater 134 and the regeneration chamber heater 145.

When desired, the molten eutectic mixture can also be provided from the pool in a liquid state and sprayed within the scrubbing chamber 13.

Figure 2:
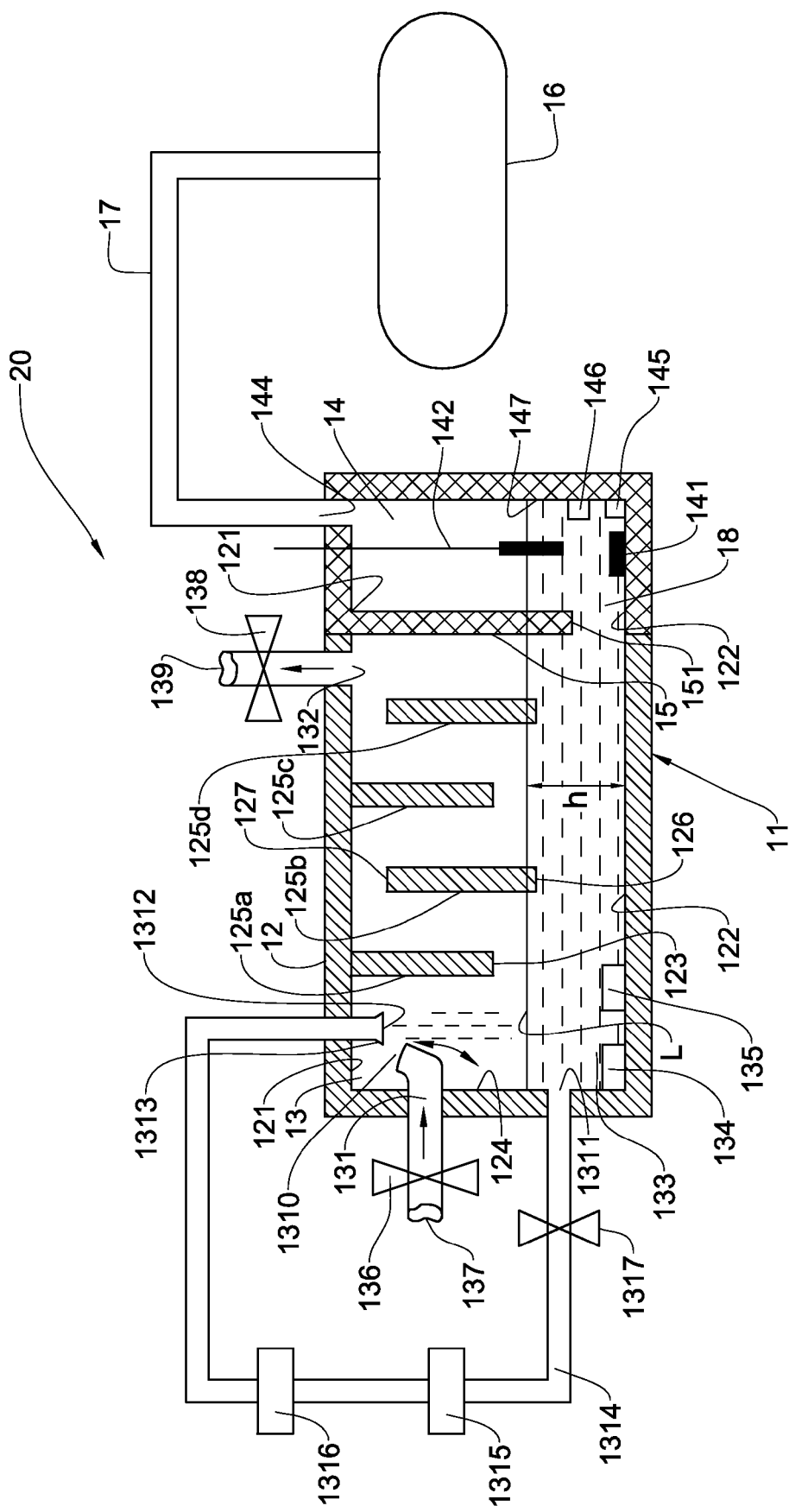

Referring to FIG. 2, there is illustrated a schematic fragmentary longitudinal cross-sectional view of an apparatus 20 for removing sulfur dioxide from a flue gas, according to another embodiment of the present invention. The apparatus 20 differs from the apparatus (10 in FIG. 1) in the act that it further includes a molten mixture outlet port 1311 arranged at a bottom of the scrubbing chamber 13 within the pool 133, and a molten mixture inlet port 1312 arranged at a top of the scrubbing chamber 13.

The scrubbing chamber 13 also includes a sprinkler 1313 coupled to the molten mixture inlet port 1312 from the inner side of the top scrubbing chamber wall 121 of the scrubbing chamber 13. The molten mixture outlet port 1311 is coupled to the molten mixture inlet port 1312 via a molten mixture manifold 1314 to provide circulation of the molten mixture from the pool 133 at the bottom of the scrubbing chamber 13 to the top of the scrubbing chamber 13 for spraying within the scrubbing chamber 13 through the sprinkler 1313.

When desired, a molten mixture outlet valve 1317 can be arranged along the molten mixture manifold 1314. The molten mixture outlet valve 1317 is configured to regulate the flow rate of the molten mixture.

The driving force for the circulation of the molten mixture is provided by a pump 1315 associated with the molten mixture manifold 1314. Preferably, apparatus 20 also includes a molten mixture filter 1316 configured for filtering out moot that can be present in the flue gas, and therefore be dispersed in the pool 133 of the molten mixture. Such filters are well known, and may, for example, be available from A&S Metallurgical Resources, Ltd., UK; A. CESANA S.p.A., DRACHE UMWELITECHNIK GmbH, GERMANY, etc.

Figure 3:
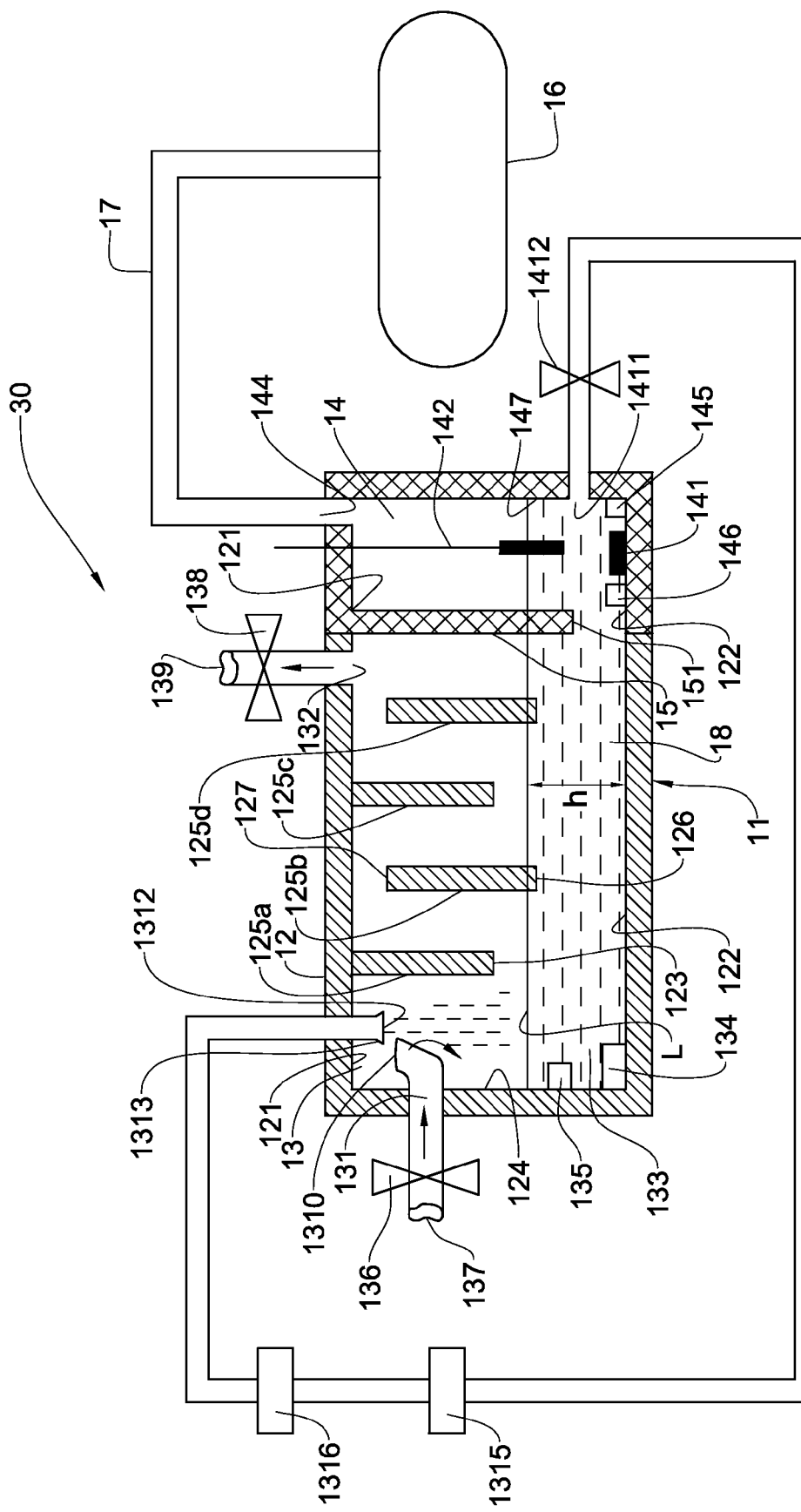

Referring to FIG. 3, there is illustrated a schematic fragmentary longitudinal cross-sectional view of an apparatus 30 for removing sulfur dioxide from a flue gas, according to a further embodiment of the present invention. The apparatus 30 differs from the apparatus (20 in FIG. 2) in the act that another molten mixture outlet port 1411 is arranged at the bottom of the regeneration chamber 14 within the pool 133 rather than the molten mixture outlet port (1311 in FIG. 2) that is arranged at the bottom of the scrubbing chamber 13, as in FIG. 2. In this case, a molten mixture manifold 1414 is provided that is coupled to the molten mixture outlet port 1411 to provide circulation of the molten mixture from the pool 133 at the bottom of the regeneration chamber 14 to the top of the scrubbing chamber 13 for spraying within the scrubbing chamber 13 through the sprinkler 1313.

When desired, another molten mixture outlet valve 1412 can be arranged along the molten mixture manifold 1414. The molten mixture outlet valve 1412 is configured to regulate the flow rate of the molten mixture.

The driving force for the circulation of the molten mixture is provided by a pump 1315 associated in this case with the molten mixture manifold 1414. Similar to the embodiment shown in FIG. 2, the apparatus 30 can also include the molten mixture filter 1316 configured for filtering out moot.

Figure 4:
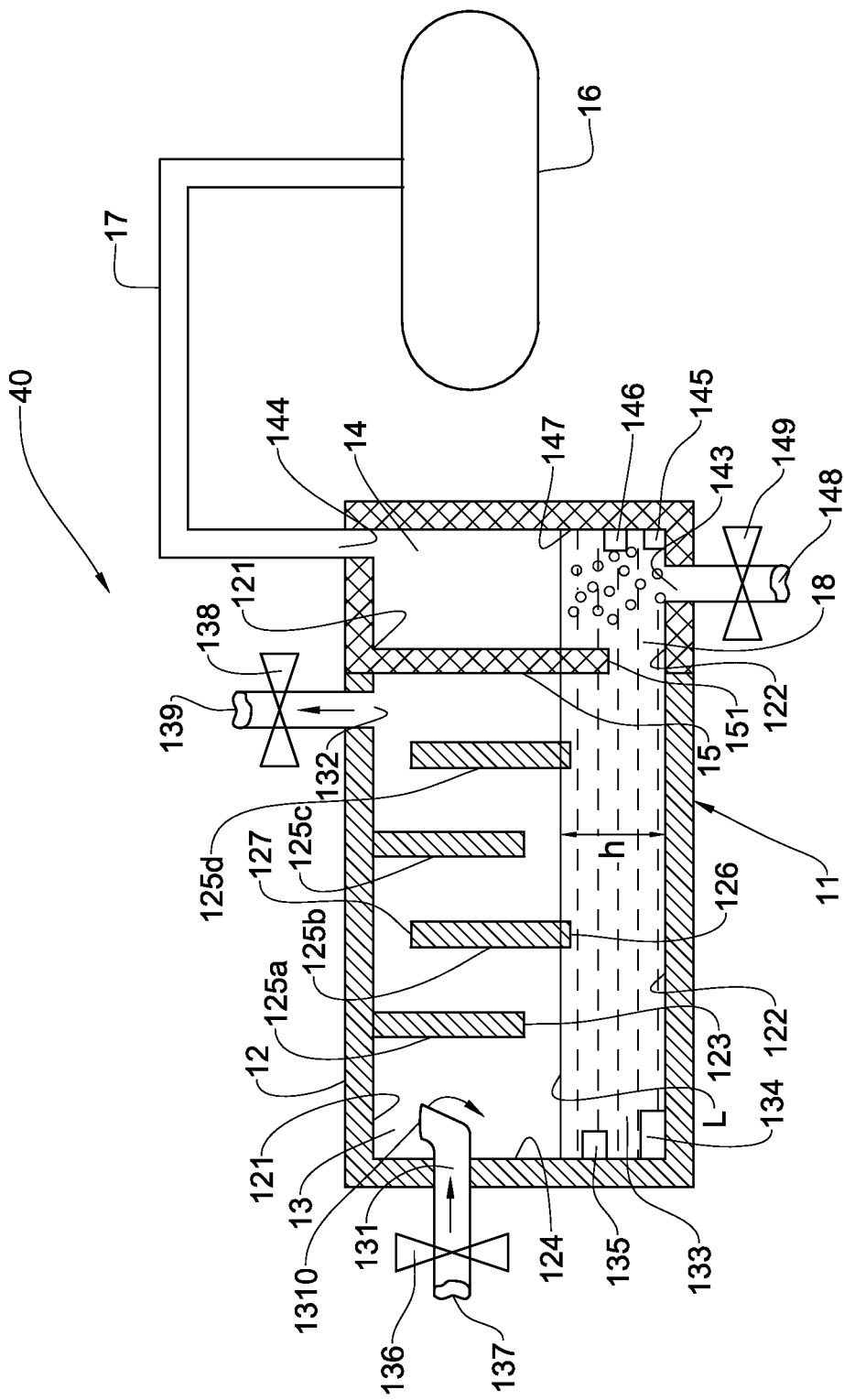

Referring to FIG. 4, there is illustrated a schematic fragmentary longitudinal cross-sectional view of an apparatus 40 for removing sulfur dioxide from a flue gas, according to still a further embodiment of the present invention. The apparatus 40 differs from the apparatus (10 in FIG. 1) in the fact that it provides chemical regeneration of a molten mixture of carbonates, sulfites and sulfates in regeneration zone to produce a sulfur-containing vapor. According to this embodiment, the regeneration chamber includes a reducing gas inlet port 143 associated with a reducing gas inlet manifold 148 configured for receiving reductant gas and directing it into the pool 133 to form a regeneration zone configured to provide chemical regeneration of the molten mixture and to produce said sulfur-containing vapor. For example, the reductant gas includes a gaseous mixture comprising carbon monoxide to provide the chemical regeneration, essentially in accordance with the following reaction:

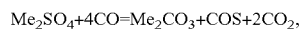

$$Me_2SO_4 + 4CO = Me_2CO_3 + COS + 2CO_2,$$

where Me is the symbol designating metals selected from Na, K and Li. It should be noted that the Gibbs free energy of this reaction for Na, K and Li sulfates is about $-100$ kJ/mol. This means that the reaction is spontaneous and process with COS production is carried out completely.

When desired, a reducing gas inlet valve 149 can be arranged along the reducing gas inlet manifold 148. The reducing gas inlet valve 149 is configured to regulate the ingress flow rate of the reductant gas.

In operation, the reductant gas is passed through the pool of the molten mixture of carbonates, sulfites and sulfates in the pool. When desired, the molten mixture of carbonates, sulfites and sulfates can be heated and maintained at the pool at the second predetermined temperature. In this case, the second predetermined temperature can for example be in the range of about 400° C. to about 1000° C.

When desired, the molten eutectic mixture can also be provided from the pool in a liquid state for circulation and sprayed within the scrubbing chamber 13, similar to the embodiments shown in FIGS. 2 and 3.

Figure 5:
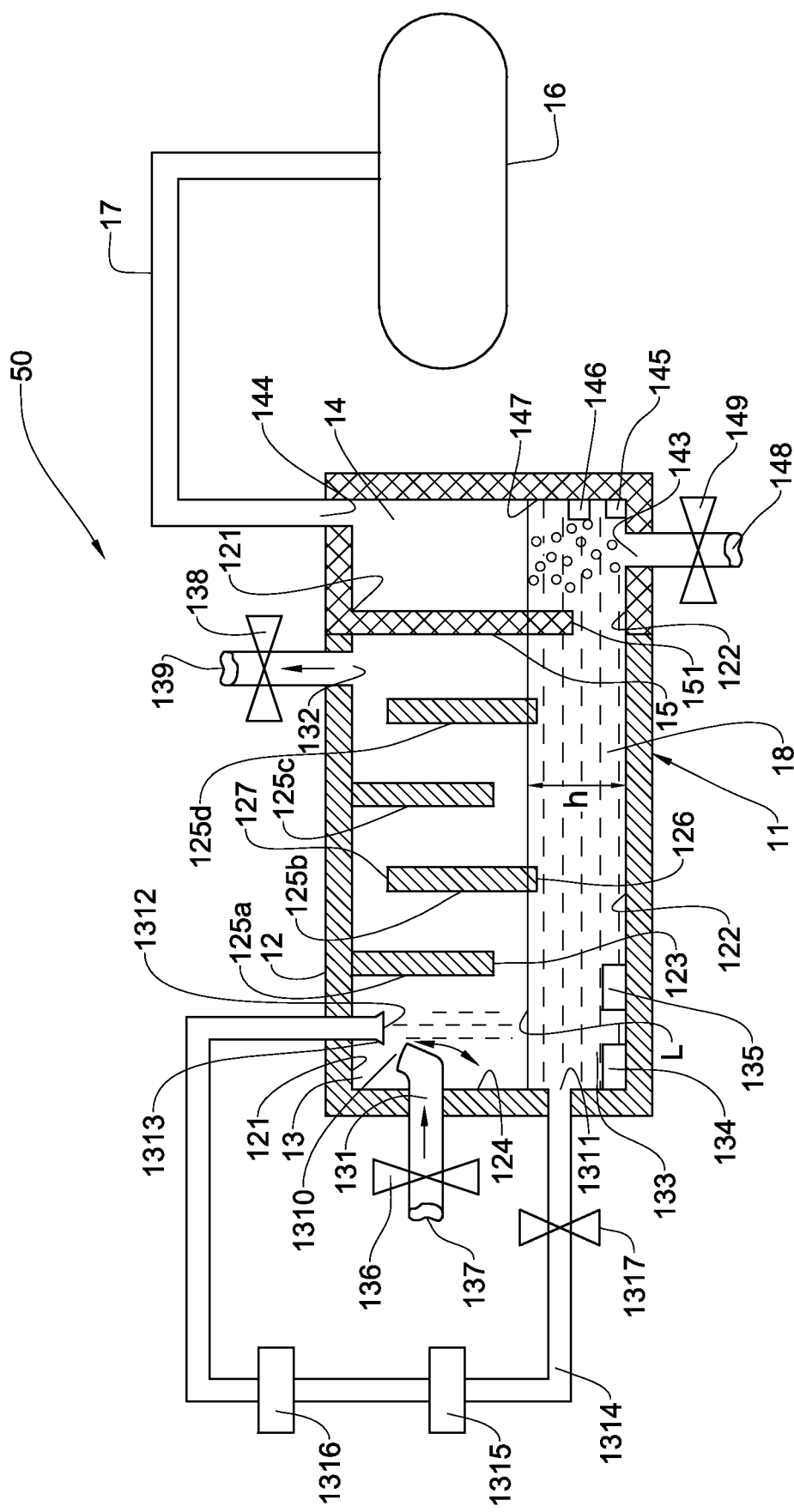

Referring to FIG. 5, there is illustrated a schematic fragmentary longitudinal cross-sectional view of an apparatus 50 for removing sulfur dioxide from a flue gas, according to a further embodiment of the present invention. The apparatus 50 differs from the apparatus (40 in FIG. 4) in the act that similar to the apparatus (20 in FIG. 2) it further includes a molten mixture outlet port 1311 arranged at a bottom of the scrubbing chamber 13 within the pool 133, and a molten mixture inlet port 1312 arranged at a top of the scrubbing chamber 13. The scrubbing chamber 13 also includes a sprinkler 1313 coupled to molten mixture inlet port 1312 from the inner side of the top scrubbing chamber wall 121 of the scrubbing chamber 13. The molten mixture outlet port 1311 is coupled to the molten mixture inlet port 1312 via a molten mixture manifold 1314 to provide circulation of the molten mixture from the pool 133 at the bottom of the scrubbing chamber 13 to the top of the scrubbing chamber 13 for spraying within the scrubbing chamber 13 through the sprinkler 1313. The driving force for the circulation of the molten mixture is provided by a pump 1315 associated with molten mixture manifold 1314. Preferably, apparatus 20 also includes the molten mixture filter 1316 configured for filtering out moot that can be present in the flue gas, and therefore be dispersed in the pool 133 of the molten mixture. When desired, the molten mixture outlet valve 1317 can be arranged along the molten mixture manifold 1314 to regulate the flow rate of the molten mixture.

Figure 6:
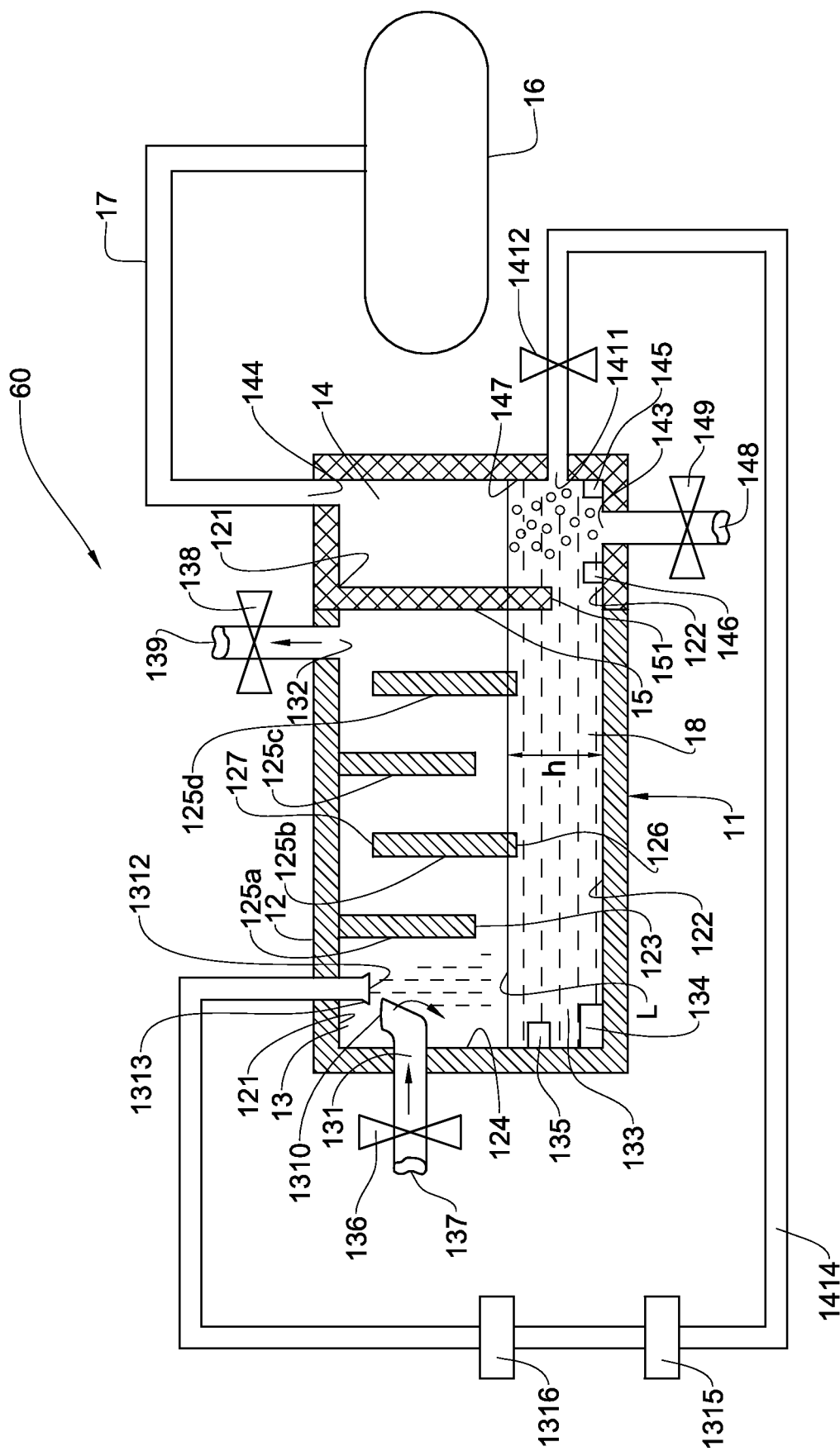

Referring to FIG. 6, there is illustrated a schematic fragmentary longitudinal cross-sectional view of an apparatus 60 for removing sulfur dioxide from a flue gas, according to yet an embodiment of the present invention. The apparatus 60 differs from the apparatus (50 in FIG. 5) in the fact that another molten mixture outlet port 1411 is arranged at the bottom of the regeneration chamber 14 within the pool 133, similar to the apparatus (30 in FIG. 3). In this case, the circulation of the molten mixture from the pool 133 to the top of the scrubbing chamber 13 for spraying within the scrubbing chamber 13 through the sprinkler 1313 is carried out through the molten mixture manifold 1414 that is coupled to the molten mixture outlet port 1411. Similar to the apparatus (30 in FIG. 3), another molten mixture outlet valve 1412 configured to regulate the flow rate of the molten mixture may be arranged along the molten mixture manifold 1414. The driving force for the circulation of the molten mixture is provided by a pump 1315 associated in this case with the molten mixture manifold 1414. Preferably, the apparatus 60 also includes the molten mixture filter 1316 configured for filtering out moot.

As such, those skilled in the art to which the present invention pertains, can appreciate that while the present invention has been described in terms of preferred embodiments, the conception, upon which this disclosure is based, may readily be utilized as a basis for the designing of other structures systems and processes for carrying out the several purposes of the present invention.

When desired, a heat exchanger (not shown) can be mounted around the conduit for maintaining required temperatures within the conduit. In this case, walls of the scrubbing chamber and walls of the regeneration chamber can be made of either similar or different materials.

Although the embodiments shown in FIGS. 2, 5 and FIGS. 3, 6 illustrate, correspondingly, the provisions in which the molten eutectic mixture is provided from the pool separately for circulation from the scrubbing chamber 13 and from the regeneration chamber 14, when desired, the molten mixture manifolds 1314 and 1414 can merge together (not shown) either before or after the pump 1315 and/or the molten mixture filter 1316. As a result, the molten mixture stream flowing from the regeneration chamber 14 through the molten mixture manifolds 1414 can confluent into the molten mixture stream flowing from the scrubbing chamber 13 through the molten mixture manifolds 1314 in a common stream passing to the top of the scrubbing chamber 13 through a merged part of the manifolds 1314 and 1414 for spraying within the scrubbing chamber 13 through the sprinkler 1313.

Also, it is to be understood that the phraseology and terminology employed herein are for the purpose of description and should not be regarded as limiting.

Finally, it should be noted that the word "comprising" as used throughout the appended claims is to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. An apparatus for removing sulfur dioxide from a flue gas, the apparatus comprising:
    a housing defining a scrubbing chamber and a regeneration chamber separated from the scrubbing chamber by a separating wall having an open region to provide a hydraulic communication between the scrubbing chamber through a pool common for the scrubbing chamber and the regeneration chamber and comprising a molten eutectic mixture of lithium, sodium and potassium carbonates; the scrubbing chamber comprising: a flue gas inlet port configured for receiving an ingress flow of said flue gas, and a scrubbed gas outlet port configured for discharging an egress flow of a scrubbed gas from the scrubbing chamber; the scrubbing chamber being configured for scrubbing the flue gas by absorbing the sulfur dioxide in the pool to form a molten mixture of carbonates, sulfites and sulfates in the pool; the regeneration chamber being configured for producing a sulfur-containing vapor; and comprising a sulfur-containing vapor outlet port configured for controllable release of the sulfur-containing vapor obtained therein; and
    a sulfur-containing material collector coupled to said sulfur-containing vapor outlet port via a cooling manifold configured for cooling down said sulfur-containing vapor, and thereby converting said sulfur-containing vapor into a liquid and solid phase materials.

2. The apparatus of claim 1, wherein said scrubbing chamber comprises a plurality of baffles arranged within said scrubbing chamber and configured to provide a turbulent flow of said flue gas within the scrubbing zone.

3. The apparatus of claim 1, wherein said separating wall between the scrubbing chamber and the regeneration chamber extends downward from a top housing wall such that a distance between a bottom end of said separating wall and a inner bottom surface of the housing wall is in the range of 30% to 50% of the pool depth of said molten mixture of carbonates, sulfites and sulfates.

4. The apparatus of claim 1, wherein said regeneration chamber comprises a regeneration chamber heater configured to heat and maintain said molten mixture of carbonates, sulfites and sulfates at a second predetermined temperature.

5. The apparatus of claim 1, wherein the scrubbing chamber further includes a nozzle coupled to the flue gas inlet port inside the scrubbing chamber, the nozzle being configured to regulate direction of the ingress flow of the flue gas into the scrubbing chamber.

6. The apparatus of claim 1, wherein the regeneration chamber comprises an anode electrode and a cathode electrode being in contact with said molten mixture of carbonates, sulfites and sulfates to form a regeneration zone configured to provide electrochemical regeneration of said molten mixture and to produce a sulfur-containing vapor.

7. The apparatus of claim 6, wherein said cathode electrode is made of an alloy containing at least one element selected from titanium, aluminium, zirconium, tantalum and niobium; and wherein said anode electrode is any one electrode selected from a titanium electrode, a carbon-clad titanium electrode, and a graphite electrode.

8. The apparatus of claim 6, wherein said cathode electrode is a potential electrode immersed into said molten mixture of carbonates, sulfites and sulfates, whereas said anode electrode is coupled to or associated with a grounded conductive surface of a bottom of the regeneration chamber.

9. The apparatus of claim 1, wherein the regeneration chamber comprises a reducing gas inlet port configured for receiving reductant gas and directing it into the pool to form a regeneration zone configured to provide chemical regeneration of said molten mixture and to produce said sulfur-containing vapor.

10. The apparatus of claim 1, wherein an inner surface of housing walls is made of an alloy containing at least one element selected from titanium, aluminium, zirconium, tantalum and niobium.

11. The apparatus of claim 1, wherein the scrubbing chamber further comprises:
a molten mixture outlet port arranged at a bottom of the scrubbing chamber within the pool;
a molten mixture inlet port arranged at a top of the scrubbing chamber, and a sprinkler coupled to the molten mixture inlet port from an inner side of a top scrubbing chamber wall of the scrubbing chamber; said molten mixture outlet port is coupled to the molten mixture inlet port via a molten mixture manifold to provide circulation of the molten mixture from the pool at the bottom of the scrubbing chamber to the top of the scrubbing chamber for spraying within the scrubbing chamber through the sprinkler.

12. The apparatus of claim 1, wherein the regeneration chamber comprises:
another molten mixture outlet port arranged at a bottom of the regeneration chamber within the pool;
a molten mixture inlet port arranged at a top of the scrubbing chamber, and a sprinkler coupled to the molten mixture inlet port from an inner side of a top scrubbing chamber wall of the scrubbing chamber; said another molten mixture outlet port is coupled to the molten mixture inlet port via a molten mixture manifold to provide circulation of the molten mixture from the pool at the bottom of the scrubbing chamber to the top of the scrubbing chamber for spraying within the scrubbing chamber through the sprinkler.

13. The apparatus of claim 12, comprising a molten mixture filter arranged within the molten mixture manifold and configured for filtering out moot present in the flue gas and dispersed in the pool of the molten mixture.

14. A method for removing sulfur dioxide from a flue gas, the method comprising:
providing a scrubbing zone and a regeneration zone separated from the scrubbing zone and being in a hydraulic communication therebetween through a pool common for the scrubbing chamber and the regeneration chamber, the pool comprising a molten eutectic mixture of lithium, sodium and potassium carbonates;
providing a controllable ingress flow of the flue gas into the scrubbing zone and thereby scrubbing said flue gas by absorbing said sulfur dioxide, and forming a molten mixture of carbonates, sulfites and sulfates along with a scrubbed gas;
producing a sulfur-containing vapor from said molten mixture of carbonates, sulfites and sulfates thereby providing an melt regeneration of said molten mixture of carbonates, sulfites and sulfates in said regeneration zone to produce a sulfur-containing vapor;
releasing said sulfur-containing vapor from said regeneration zone;
cooling down the released sulfur-containing vapor for converting said released sulfur-containing vapor into liquid and solid phase materials; and
collecting said liquid and solid phase materials for a further utilization.

15. The method of claim 14, wherein said producing a sulfur-containing vapor includes is an electrochemical melt regeneration comprising the step of providing an anode electrode and a cathode electrode, and contacting the anode cathode electrodes with said molten mixture of carbonates, sulfites and sulfates within a regeneration zone; and applying a predetermined electric voltage across the anode electrode and the cathode electrode to provide an electric current having predetermined current density there between.

16. The method of claim 15, wherein said predetermined electric voltage is in the range of about 0.5V to 20V, and wherein said predetermined electric current density is in the range of about 0.005 $A/cm^2$ to 5 $A/cm^2$.

17. The method of claim 14, wherein said producing a sulfur-containing vapor includes a chemical melt regeneration comprising the step of treating said molten mixture of carbonates, sulfites and sulfates with a reductant gas by passing said gaseous mixture through said molten mixture.

18. The method of claim 17, wherein said reductant gas is a gaseous mixture comprising carbon monoxide.

19. The method of claim 14, comprising heating the pool in the scrubbing zone to a first predetermined temperature is in the range of about 400° C. to about 500° C., and heating the pool in the regeneration zone to a second predetermined temperature is in the range of about 400° C. to about 1000° C.

20. The method of claim 14, comprising discharging an egress flow of a scrubbed gas from the scrubbing zone.

21. The method of claim 14, comprising providing a turbulent flow of said flue gas within the scrubbing zone.

* * * * *